(12) United States Patent
Oh et al.

(10) Patent No.: US 11,543,687 B2
(45) Date of Patent: Jan. 3, 2023

(54) OPTOELECTRONIC DEVICE

(71) Applicant: ROCKLEY PHOTONICS LIMITED, Altrincham (GB)

(72) Inventors: Dong Yoon Oh, Pasadena, CA (US); Hooman Abediasl, Pasadena, CA (US); Yi Zhang, Pasadena, CA (US); Aaron John Zilkie, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 25 days.

(21) Appl. No.: 17/054,486

(22) PCT Filed: May 10, 2019

(86) PCT No.: PCT/IB2019/000508
§ 371 (c)(1),
(2) Date: Nov. 10, 2020

(87) PCT Pub. No.: WO2019/215501
PCT Pub. Date: Nov. 14, 2019

(65) Prior Publication Data
US 2021/0191163 A1 Jun. 24, 2021

Related U.S. Application Data

(60) Provisional application No. 62/670,455, filed on May 11, 2018.

(51) Int. Cl.
*G02F 1/01* (2006.01)
*G02F 1/025* (2006.01)
(52) U.S. Cl.
CPC ............ *G02F 1/0147* (2013.01); *G02F 1/025* (2013.01)

(58) Field of Classification Search
CPC .... G02F 1/025; G02F 1/225; G02F 2001/212; G02F 2001/0151; G02F 2203/50; G02B 2006/12142
(Continued)

(56) References Cited

U.S. PATENT DOCUMENTS 6,031,957 A * 2/2000 Suzuki .................... G02F 1/011
385/37
6,093,334 A * 7/2000 Suzuki .................... G02F 1/011
216/2
(Continued)

FOREIGN PATENT DOCUMENTS

DE  0837352 A2 * 10/1997 ............. G02F 1/025
EP  1 990 671 A2  11/2008
(Continued)

OTHER PUBLICATIONS

International Search Report and Written Opinion of the International Searching Authority, dated Oct. 31, 2019, Corresponding to PCT/IB2019/000508, 15 pages.
(Continued)

*Primary Examiner* — Robert Tavlykaev
(74) *Attorney, Agent, or Firm* — Lewis Roca Rothgerber Christie LLP

(57) ABSTRACT

An optoelectronic device. The optoelectronic device comprising: a rib waveguide provided on a substrate of the device, the rib waveguide comprising a ridge portion and a slab portion; a heater, disposed within the slab portion; a thermally isolating trench, adjacent to the rib waveguide, and extending into the substrate of the device; and a thermally isolating cavity within the substrate, which is directly connected to the thermally isolating trench, and which extends across at least a part of a width of the rib waveguide between the rib waveguide and the substrate.

23 Claims, 7 Drawing Sheets

(58) Field of Classification Search
USPC .......................................................... 385/1–3
See application file for complete search history.

(56) References Cited

U.S. PATENT DOCUMENTS

| | | | | |
|---|---|---|---|---|
| 6,828,171 | B2* | 12/2004 | Kubby | H01L 21/764 |
| | | | | 257/E21.573 |
| 6,847,750 | B1* | 1/2005 | Baumann | G02F 1/011 |
| | | | | 385/16 |
| 6,922,422 | B2* | 7/2005 | Peters | H01S 5/024 |
| | | | | 372/50.1 |
| 6,983,086 | B2* | 1/2006 | Fardi | G02F 1/025 |
| | | | | 438/31 |
| 7,565,038 | B2* | 7/2009 | Earnshaw | G02F 1/0147 |
| | | | | 385/1 |
| 7,630,596 | B2* | 12/2009 | Watanabe | B81B 3/0081 |
| | | | | 216/2 |
| 7,920,770 | B2* | 4/2011 | Holzwarth | G02B 6/122 |
| | | | | 385/129 |
| 8,078,013 | B2* | 12/2011 | Li | G02F 1/025 |
| | | | | 385/129 |
| 9,059,252 | B1* | 6/2015 | Liu | G02B 6/12004 |
| 9,448,422 | B2* | 9/2016 | Celo | G02B 6/3596 |
| 10,416,380 | B1* | 9/2019 | Chen | G02B 6/1228 |
| 2004/0151460 | A1 | 8/2004 | Kitcher et al. | |
| 2004/0264836 | A1* | 12/2004 | Kawashima | G02F 1/025 |
| | | | | 385/14 |
| 2007/0196049 | A1 | 8/2007 | Gunn, III | |
| 2010/0054653 | A1* | 3/2010 | Carothers | G02B 6/122 |
| | | | | 438/682 |
| 2010/0111461 | A1* | 5/2010 | Takahashi | G02F 1/0147 |
| | | | | 385/1 |
| 2012/0076465 | A1* | 3/2012 | Chen | G02B 6/1228 |
| | | | | 385/124 |
| 2012/0087613 | A1* | 4/2012 | Rasras | G02F 1/2257 |
| | | | | 257/E31.124 |
| 2013/0336613 | A1* | 12/2013 | Meade | G02F 1/3133 |
| | | | | 438/31 |
| 2015/0125111 | A1 | 5/2015 | Orcutt et al. | |
| 2015/0253510 | A1* | 9/2015 | Celo | G02F 1/225 |
| | | | | 385/16 |

FOREIGN PATENT DOCUMENTS

| | | |
|---|---|---|
| GB | 2 385 145 A | 8/2003 |
| GB | 2571269 A | 8/2019 |
| GB | 2595588 A | 12/2021 |
| WO | WO 2009/051148 A1 | 4/2009 |
| WO | WO 2017/039696 A1 | 3/2017 |
| WO | WO 2017/160630 A1 | 9/2017 |
| WO | WO 2018/011373 A1 | 1/2018 |

OTHER PUBLICATIONS

Fang, Q. et al., "Ultralow Power Silicon Photonics Thermo-Optic Switch With Suspended Phase Arms", IEEE Photonics Technology Letters, Apr. 15, 2011, pp. 525-527, vol. 23, No. 8, IEEE.

Masood, A. et al., "Comparison of heater architectures for thermal control of silicon photonic circuits", 2013, pp. 83-84, IEEE.

U.K. Intellectual Property Office Examination Report, dated Jan. 26, 2022, for Patent Application No. GB2018426.3, 3 pages.

* cited by examiner

OPTOELECTRONIC DEVICE

CROSS-REFERENCE TO RELATED APPLICATION(S)

This application is a national stage entry, under 35 U.S.C. § 371, of International Application Number PCT/IB2019/000508, filed on May 10, 2019, which claims priority to and the benefit of U.S. Provisional Patent Application No. 62/670,455, filed May 11, 2018. The entire contents of all of the applications identified in this paragraph are incorporated herein by reference.

FIELD OF THE INVENTION

Embodiments of the present invention relate to an optoelectronic device, and particularly to an optoelectronic device which includes or is a thermally efficient phase shifter including a thermally isolating trench and cavity.

BACKGROUND

Efficient phase shifters are an essential building block for photonic integrated circuits in various applications. For example, optical switches and optical phase arrays often contain tens or hundreds of phase shifters. Thermo-optic phase shifters operate through the principle that a material's refractive index is dependent on temperature. The degree to which a material's refractive index varies in response to varying temperature is classified through the thermo-optic coefficient: dn/dT.

Therefore, given the relatively large number of phase shifters required, it is desirable to minimise the power consumption of the phase shifters. Thermo-optic phase shifters can be made very efficient (on the order of <1 mW for a πr-phase shift) with proper thermal isolation.

However, there is a trade-off between efficiency and speed for such phase shifters. Good thermal isolation can increase the efficiency whilst decreasing the speed significantly. Often, the speed is an important performance metric for a phase shifter.

For example, Fang, Qing et al. "*Ultralow power silicon photonics thermo-optic switch with suspended arms*" IEEE Photon, Technol. Letter. 23.8 (2011): 525-527 demonstrate an efficient thermo-optic heater (0.49 mW/it) with a response time of around 266 μs.

There is a need then to optimise the heater and thermal isolation design so as to meet both the needs of efficiency and speed.

SUMMARY

Accordingly, in a first aspect, embodiments of the invention provide an optoelectronic device comprising:
- a rib waveguide provided on a substrate of the device, the rid waveguide comprising a ridge portion and a slab portion;
- a heater, disposed within the slab portion;
- a thermally isolating trench, adjacent to the rib waveguide, and extending into the substrate of the device; and
- a thermally isolating cavity within the substrate, which is directly connected to the thermally isolating trench, and which extends across at least a part of a width of the rib waveguide between the rib waveguide and the substrate.

Such an optoelectronic device delivers significant thermal efficiency, as the heater and rib waveguide can be (to a large extent) thermally decoupled from the surrounding device. The thermally isolating trenches can provide thermal isolation in the horizontal direction (i.e. in the same plane as the waveguide and slab), whereas the thermally isolating cavity can provide thermal isolation in the vertical direction (i.e. perpendicular to the slab). For example, embodiments of the invention can achieve a π-phase shift using between 1 mW and 20 mW and a 10-90% response time (i.e. the time taken for the power output of the device to rise from 10% to 90% of the total change in magnitude between the valley and the peak of a voltage output curve) of between 10 and 50 μs.

Optional features of the invention will now be set out. These are applicable singly or in any combination with any aspect of the invention.

The rib waveguide may be a ridge waveguide, in that it comprises only the ridge portion and no slab portion. The optoelectronic device may be a phase shifter. The optoelectronic device may be an electro-absorption modulator, or a photodiode, including phase shifting or phase tuning capability.

The heater may have a length, as measured in a direction parallel to the guiding direction of the waveguide, of between 50 μm and 500 μm. The or each thermally isolating trench may have a length, as measured in a direction parallel to the guiding direction of the waveguide, of between $0.5\,L_h$ and $1.0\,L_h$, where $L_h$ is the length of the heater as measured in the guiding direction of the waveguide.

The thermally isolating trench may be positioned on an opposing side of the heater to the ridge portion.

The device may further comprise a second thermally isolating trench, disposed on an opposing side of the rib waveguide to the first thermally isolating trench. The second thermally isolating trench may be connected to the thermally isolating cavity, such that an overhang portion of the rib waveguide between the first thermally isolating trench and the second thermally isolating trench does not directly abut the substrate.

The or each thermally isolating trench may be fluidly connected to the thermally isolating cavity.

The or each thermally isolating trench and the thermally isolating cavity may be filled with a contiguous insulator.

The thermally isolating cavity may have a semi-circular cross-section as viewed along a guiding direction of the rib waveguide. The thermally isolating cavity may be formed of two partially overlapping regions each having a semi-circular cross-section as viewed along a guiding direction of the rib waveguide.

The optoelectronic device may further comprise a third thermally isolating trench, spaced from the first thermally isolating trench in a direction parallel to the guiding direction of the waveguide, said third thermally isolating trench extending into the substrate. The thermally isolating cavity may extend from the first thermally isolating trench to the third thermally isolating trench, between the slab portion of the waveguide and the substrate. The optoelectronic device may comprise a fourth thermally isolating trench, spaced from the first thermally isolating trench in a direction parallel to the guiding direction of the waveguide, said fourth thermally isolating trench extending into the substrate and positioned on an opposing side of the rib waveguide to the third thermally isolating trench. The thermally isolating cavity may extend from the second thermally isolating trench to the fourth thermally isolating trench, between the slab portion of the waveguide and the substrate.

There may be a gap located between pairs of thermally isolating trenches on the same side of the rib waveguide. The gap between pairs of thermally isolating trenches may have a length of between 5 μm and 20 μm. There may be an array of thermally isolating trenches, in pairs, where members of a pair are disposed on opposite sides of the rib waveguide. There may be a plurality of thermally isolating cavities, one associated with each pair of thermally isolating trenches of the array of thermally isolating trenches.

In a second aspect, embodiments of the invention provide a method of forming an optoelectronic device, including the steps of:

providing a rib waveguide on a substrate of the device, the rib waveguide comprising a ridge portion and a slab portion;

providing a heater, disposed within the slab portion;

etching a thermally isolating trench into the substrate, the trench being adjacent to the rib waveguide;

exposing the device to an etching fluid, thereby etching a thermally isolating cavity within the substrate which at least extends from, and is directly connected to, the thermally isolating trench across a width of the rib waveguide between the rib waveguide and the substrate.

The method may include any, or any combination insofar as they are compatible, of the following optional features.

The etching fluid may be any one of: an etching gas, an etching liquid, or an etching vapour.

The etching fluid may be an etching gas. The etching gas may be $XeF_2$.

The thermally isolating trench may be positioned on an opposing side of the heater to the ridge portion.

The method may further comprise the step of: etching a second thermally isolating trench, into the substrate of the device, the second thermally isolating trench being on an opposite side of the ridge portion to the first thermally isolating trench. The thermally isolating cavity within the substrate may extend from the first thermally isolating trench to the second thermally isolating trench.

The method may further comprise a step of etching a third thermally isolating trench, at a position spaced from the first thermally isolating trench along a direction parallel with the guiding direction of the rib waveguide.

The method may further comprise a step of etching a fourth thermally isolating trench, at a position spaced from the first thermally isolating trench along a direction parallel with the guiding direction of the rib waveguide and on an opposing side of the rib waveguide to the first thermally isolating trench.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
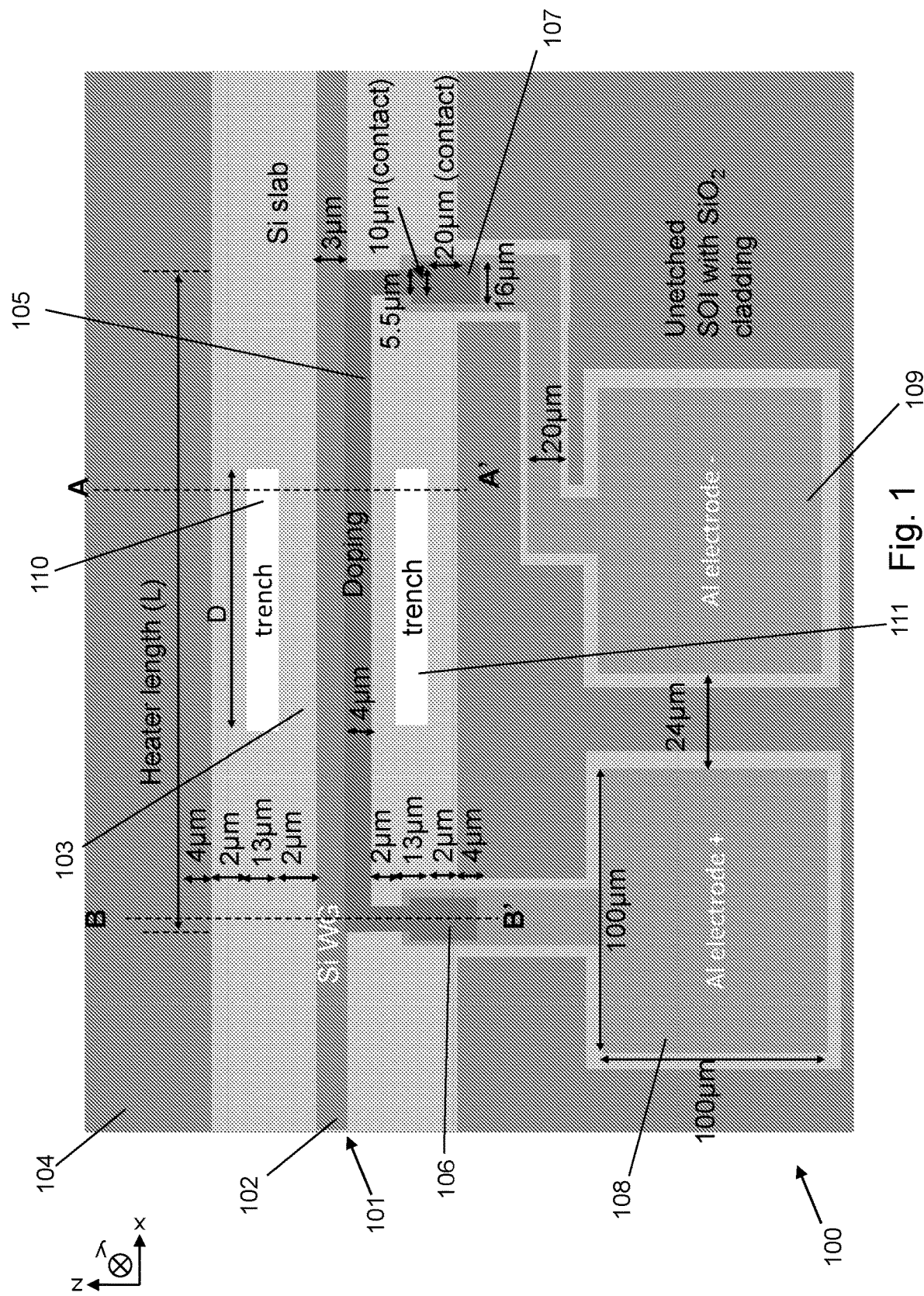
FIG. 1 shows a top-down view of an optoelectronic device according to an embodiment of the present invention.

FIG. 1 shows a top-down view of an optoelectronic device 100 according to an embodiment of the present invention. The device includes a silicon rib waveguide 101, which is formed of a ridge portion 102 and a slab portion 103. The waveguide guides light in a guiding direction (in this example along the x axis). The waveguide is on the upper surface of substrate 104, chiefly formed from silicon and clad on an upper surface with $SiO_2$. The waveguide itself is also clad on an upper surface and sidewall surfaces by $SiO_2$, and on a lower surface (defining a boundary between the waveguide and the substrate, or the waveguide and the thermally isolating cavity discussed below) by a buried oxide layer (which may also be formed of $SiO_2$). The ridge portion may have a width, measured in a direction perpendicular to the guiding direction of the waveguide (z direction in FIG. 1) of around 3 μm. The slab portion may have a width measured in the same direction of around 38 μm in total, and may have two regions (one on either side of the ridge portion) one having a width of around 21 μm (containing the heater) and the other having a width of around 17 μm.

Adjacent the ridge portion 102, and within a portion of the slab portion 103 is a heater 105. The heater is formed by doping a portion of the slab with dopants (in this example, n-type dopants) and in this example has a width of 4 μm. The heater is connected and respective ends to a first electrical interface 106 and second interface electrical 107, which respectively connect the heater to a first aluminium electrode 108 and a second aluminium electrode 109. The electrodes may be generally square in shape, having a dimension of 100 μm×100 μm. Passing current from the first electrode to the second electrode causes the heater to heat the waveguide 101, and thereby cause a phase shift in light passing therethrough.

Located at a position adjacent to the rib waveguide 101 are thermally isolating trenches 110 and 111. The thermally isolating trenches define an extremity (in the z direction) of a region of the slab portion of the rib waveguide. As will be discussed in more detail with reference to FIG. 2, the thermally isolating trenches form a connection with the thermally isolating cavity which extends beneath the rib waveguide such that a portion of the rib waveguide overhands the cavity. The thermally isolating trenches have a length D which can be a function of, and is generally less than, the heater length L.

Figure 2:
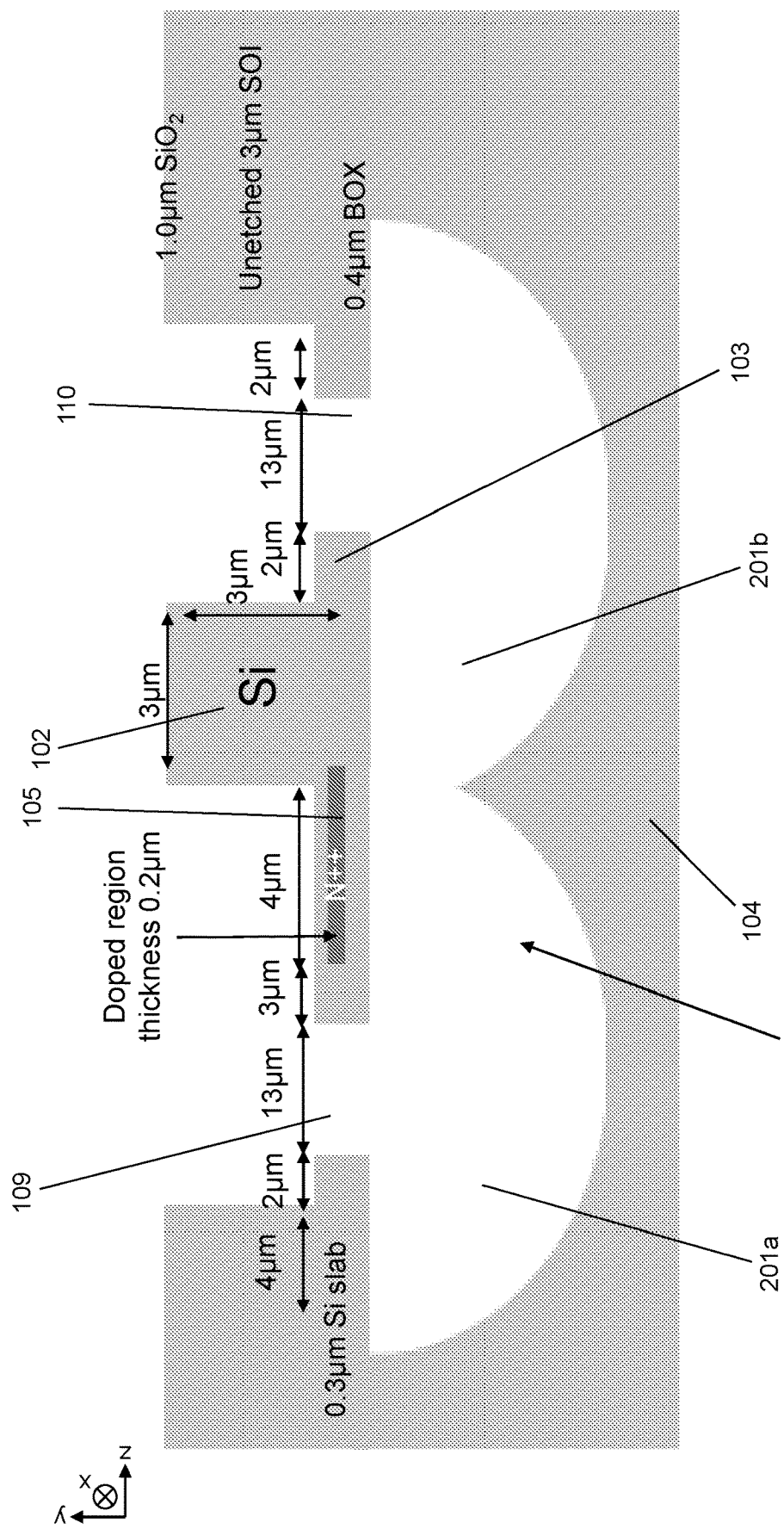
FIG. 2 shows a cross-sectional view of the optoelectronic device of FIG. 1 taken along the line A-A'.

FIG. 2 shows a cross-sectional view of the optoelectronic device 100 of FIG. 1, taken along the line A-A'. Like features are indicated by like reference numerals. As can be seen in this view, each of the thermally isolating trenches 110 and 111 are connected to a thermally isolating cavity 201 which extends beneath the rib waveguide 102. The thermally isolating cavity 201 is formed of two semi-circular voids 201a and 201b which partially overlap. The cavity therefore takes the shape of two semi-circular prisms which partially overlap, the prisms extending in a direction parallel to the guiding direction of the waveguide. The cavity takes this shape due to the isotropic etching technique used to form the cavity. As the thermally isolating trenches 110 and 111 connect to the thermally isolating cavity, and the thermally isolating cavity 201 extends across a width of the rib waveguide, a portion of the rib waveguide is physically isolated from the surrounding substrate.

Figure 3:
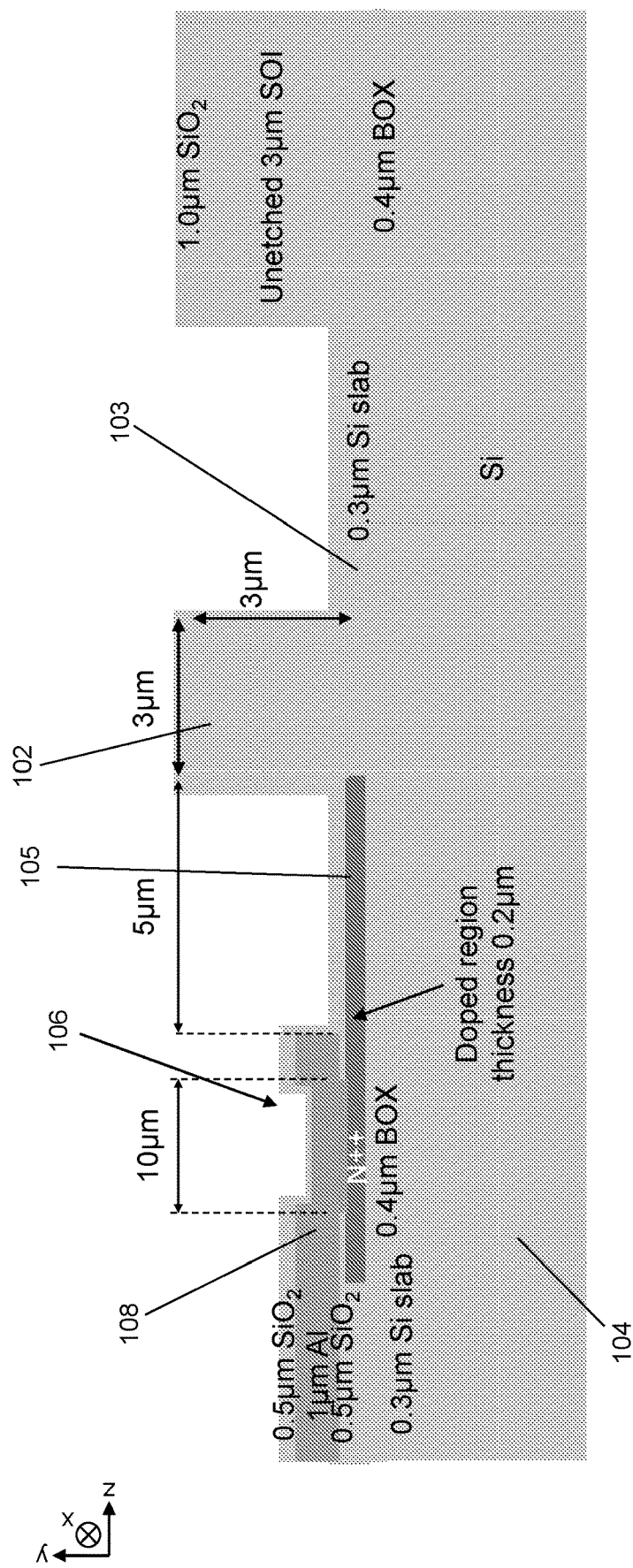
FIG. 3 shows a cross-sectional view of the optoelectronic device of FIG. 1 taken along the line B-B'.

FIG. 3 shows a cross-sectional view of the optoelectronic device 100 of FIG. 1, taken along the line B-B'. Like features are indicated by like reference numerals. This view better shows the electrical connection made between the heater 105 and the first electrode 108. The heater extends from the slab portion of the rib waveguide in a direction away from the ridge portion, so as to electrically contact a connecting portion of the aluminium electrode 108. The connecting portion of the aluminium electrode extends through the silicon dioxide layer, so as to make electrical contact with the heater 105. A similar connection is made in the second electrical interface 107, between a second portion of the heater 105 and the second aluminium electrode 109.

Figure 4:
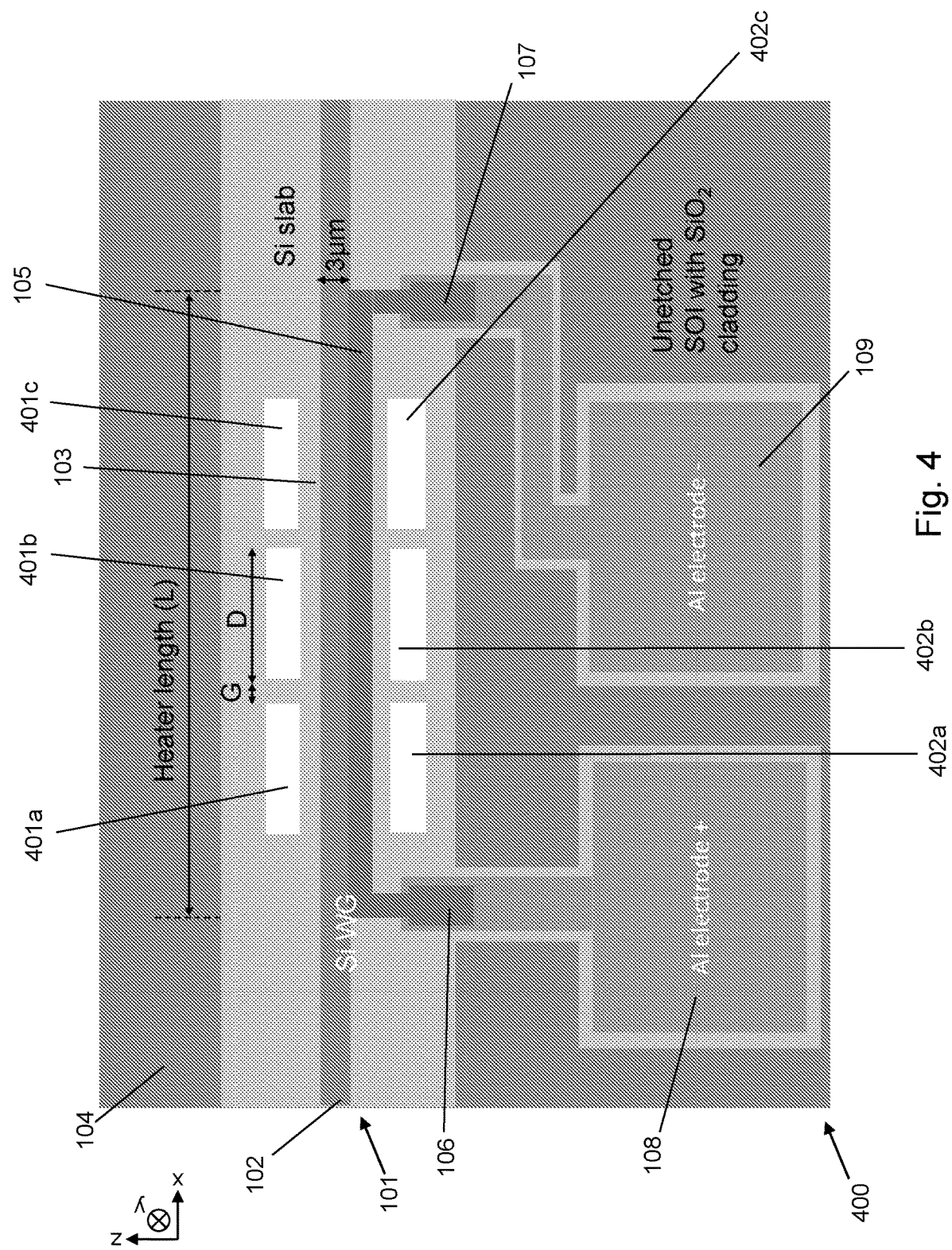
FIG. 4 shows a top-down view of an optoelectronic device according to an embodiment of the present invention.

FIG. 4 shows a top-down view of an optoelectronic device 400 according to an embodiment of the present invention. The device 400 shares a number of features with device 100 shown in FIG. 1, and so like features are indicated by like reference numerals. In contrast to the device 100 of FIG. 1, device 400 includes six thermally isolating trenches. On a first side of the rib waveguide, thermally isolating trenches 401a, 401b, and 401c are disposed. These trenches are spaced in the guiding direction, leaving gaps of length G between each trench. Similarly, on a second side of the rib waveguide, thermally isolating trenches 402a, 402b and 402c are disposed. These trenches are also spaced in the guiding direction, leaving gaps of length G between each trench. Pairs of thermally isolating trenches: 401a and 402a, 401b and 402b, and 401c and 402c may mirror one another in a line taken along the centre of the rib waveguide 102. As before, each thermally isolating trench is connected to a thermally isolating cavity (of the type shown in FIG. 2). Such a structure can provide increased stability and strength in comparison to a thermally isolating trench which extends the same distance without gaps, as the 'bridges' formed by the gaps provide further support to the rib waveguide 101.

Figure 5A:
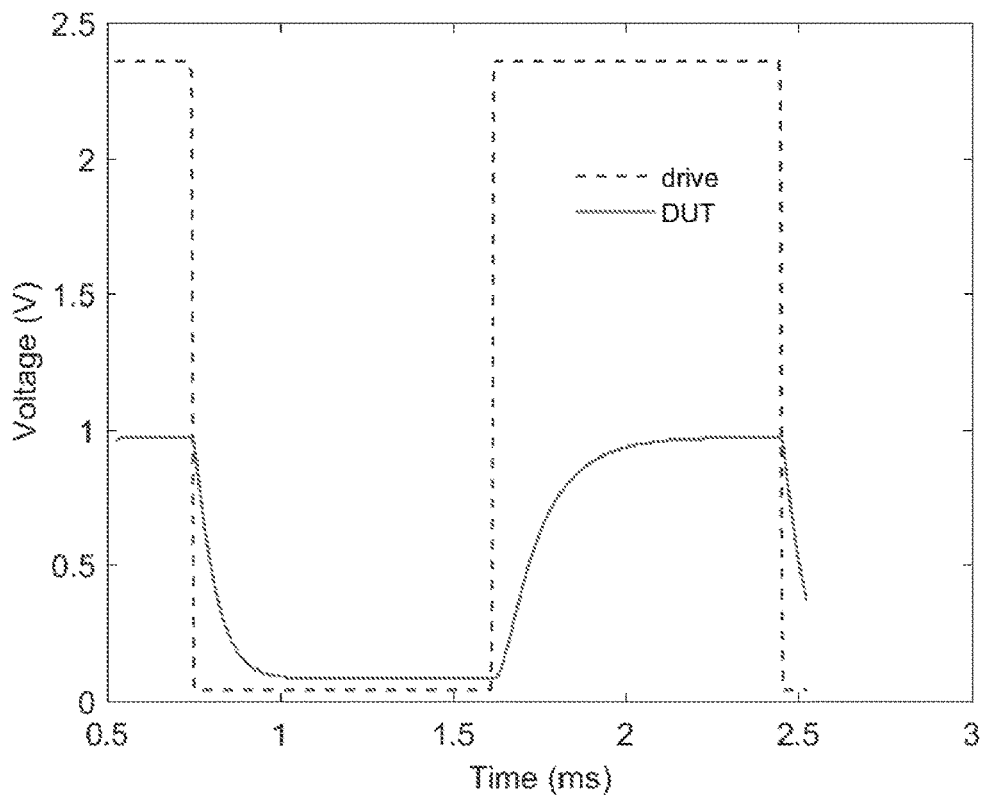
FIGS. 5A and 5B show thermal response time measurements of doped Si heaters with and without undercuts respectively.
Figure 5B:
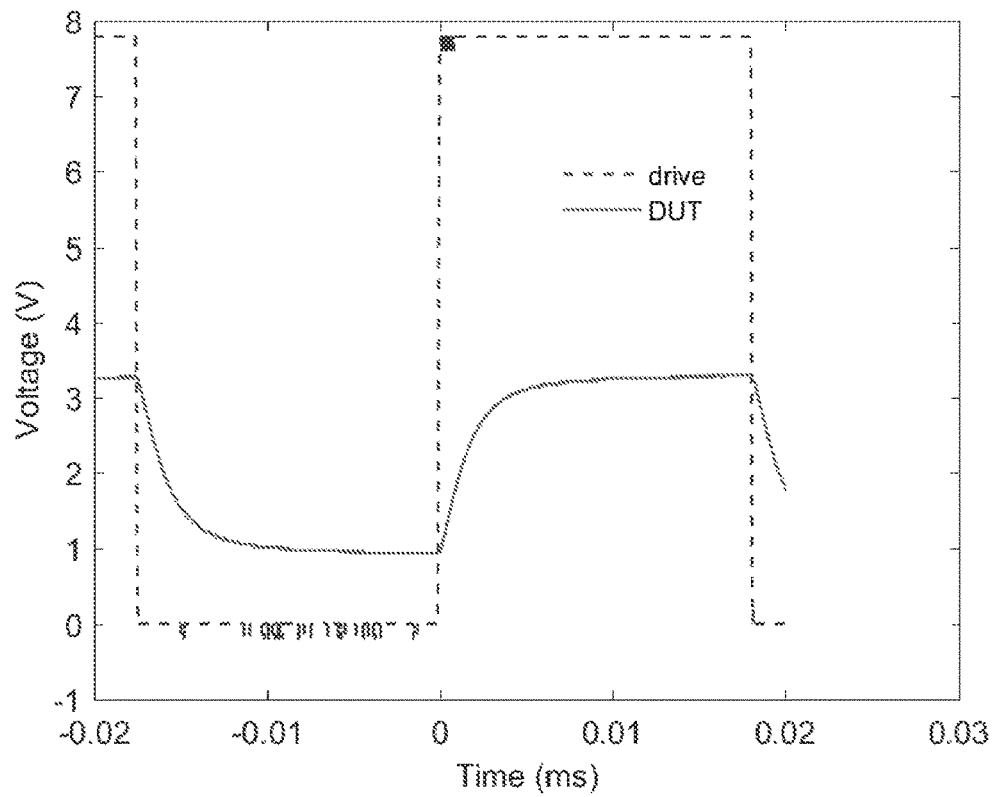

FIGS. 5A and 5B are plots showing the transient response of two thermo-optic phase shifters, one without an undercut/thermally isolating cavity (FIG. 5A) and one with an undercut/thermally isolating cavity (FIG. 5B). In both plots, the dotted line indicates the voltage applied to the phase shifter electrodes. The solid line corresponds go the voltage readout from an oscilloscope channel connected to a photodetector connected downstream of the phase shifter. Essentially, the voltage is proportional to the photocurrent generated in the photodetector, which is proportional to the optical power coming from the phase shifter. As can be seen, the transient response (shown in the x-axis of the two plots) of the device without an undercut/thermally isolating cavity is substantially longer than the device with the undercut/thermally isolating cavity. The device in FIG. 5A has a transient response time on the order several hundreds of microseconds, whereas the device in FIG. 5B has a transient response time on the order of a few microseconds.

Figure 6A:
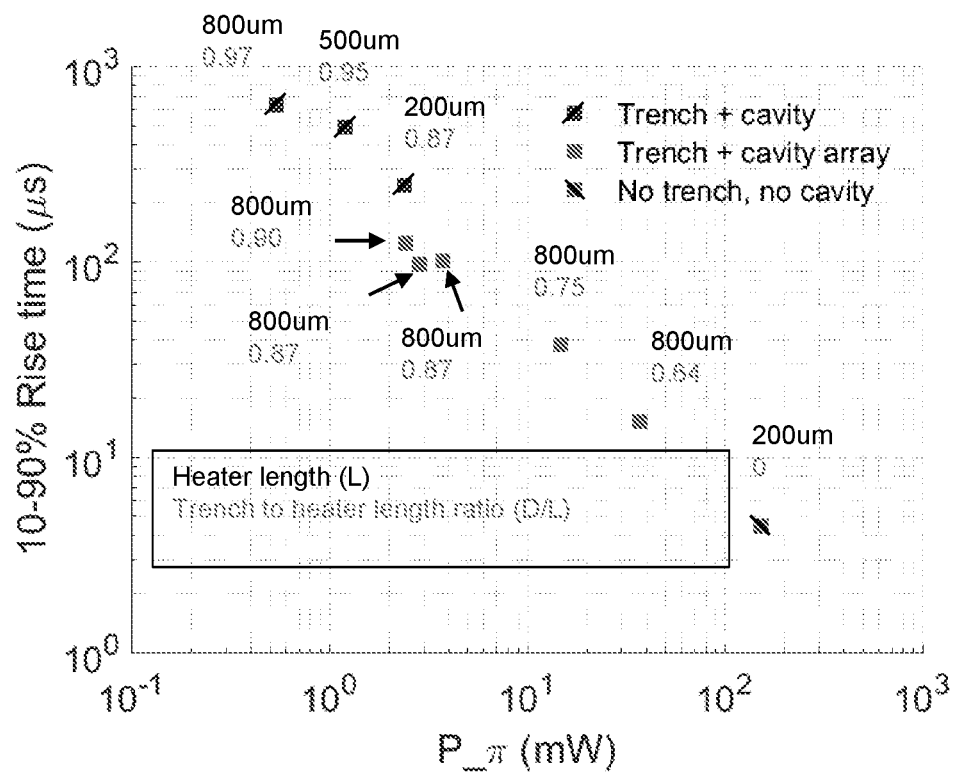
FIGS. 6A and 6B show a plot of transient-response time against power, and ratio of trench length to heater length respectively.
Figure 6B:
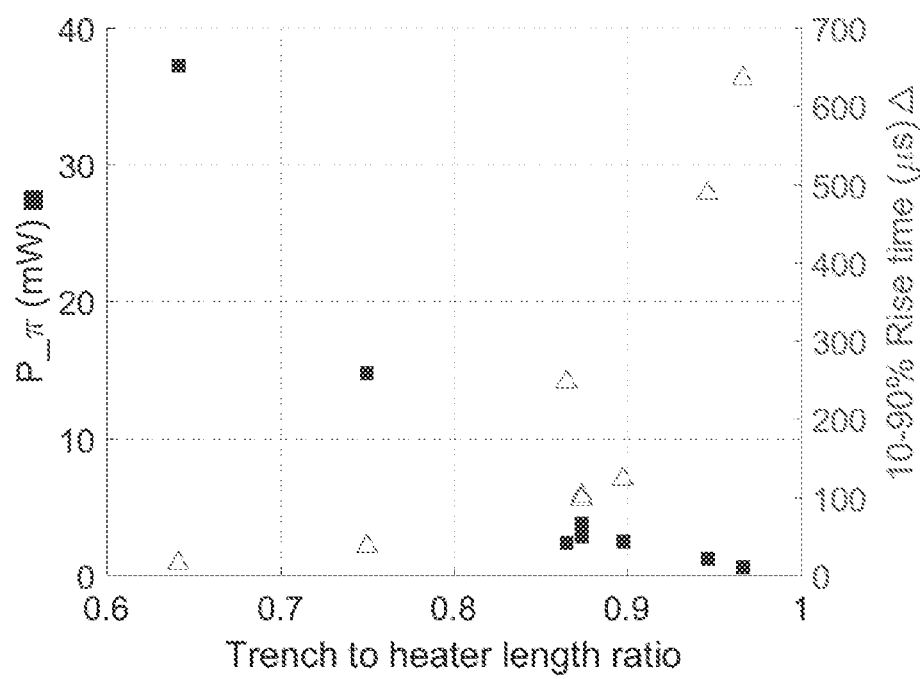

FIG. 6A is a plot of heater length v rise time for various devices: devices with a trench and a single thermally isolating cavity (Ntr=1), devices with a trench and an array of thermally isolating cavities (Ntr>1) and those without a trench and without any cavities. 10-90% rise time v $P_\pi$ shows a negative correlation and a linear relationship. The data from various heater lengths (200 µm, 500 µm, 800 µm) are plotted together and align well on a single linear curve. Therefore, the length of the heater may not be considered a determining factor for the transient time or the efficiency. The ratio of trench length to heater length (D/L) is shown in the plot of FIG. 6B.

Figure 7:
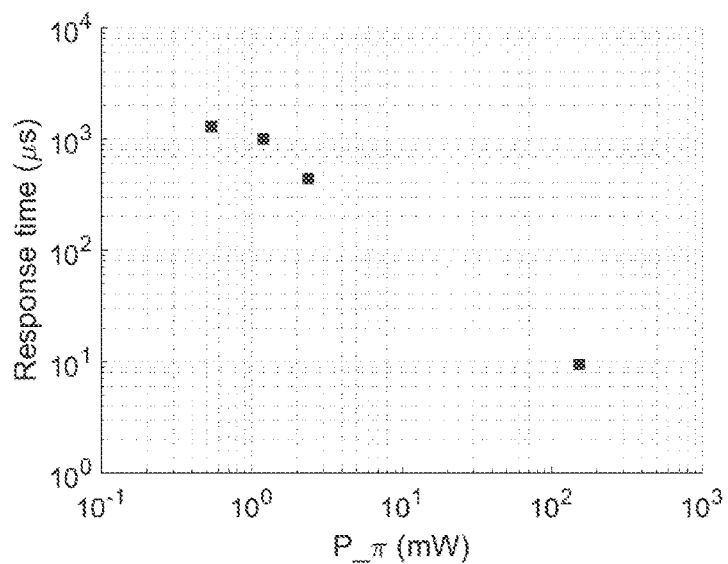
FIG. 7 is a plot of power consumption against response time.

FIG. 7 is a plot of power consumption against response time for four optoelectronic devices. The left hand three had the thermally isolating features discussed above (trenches and cavity), whereas the right hand device did not contain any thermally isolating features. The devices with undercuts had an undercut length (the length of the or each trench) which was equal to the length of the heater. The response time is defined as the sum of the 10-90% rise and fall time. $P_\pi$ is the electrical power consumed for a π-phase shift. The plot illustrates that there is a trade-off between speed and efficiency of the heater.

Figure 8:
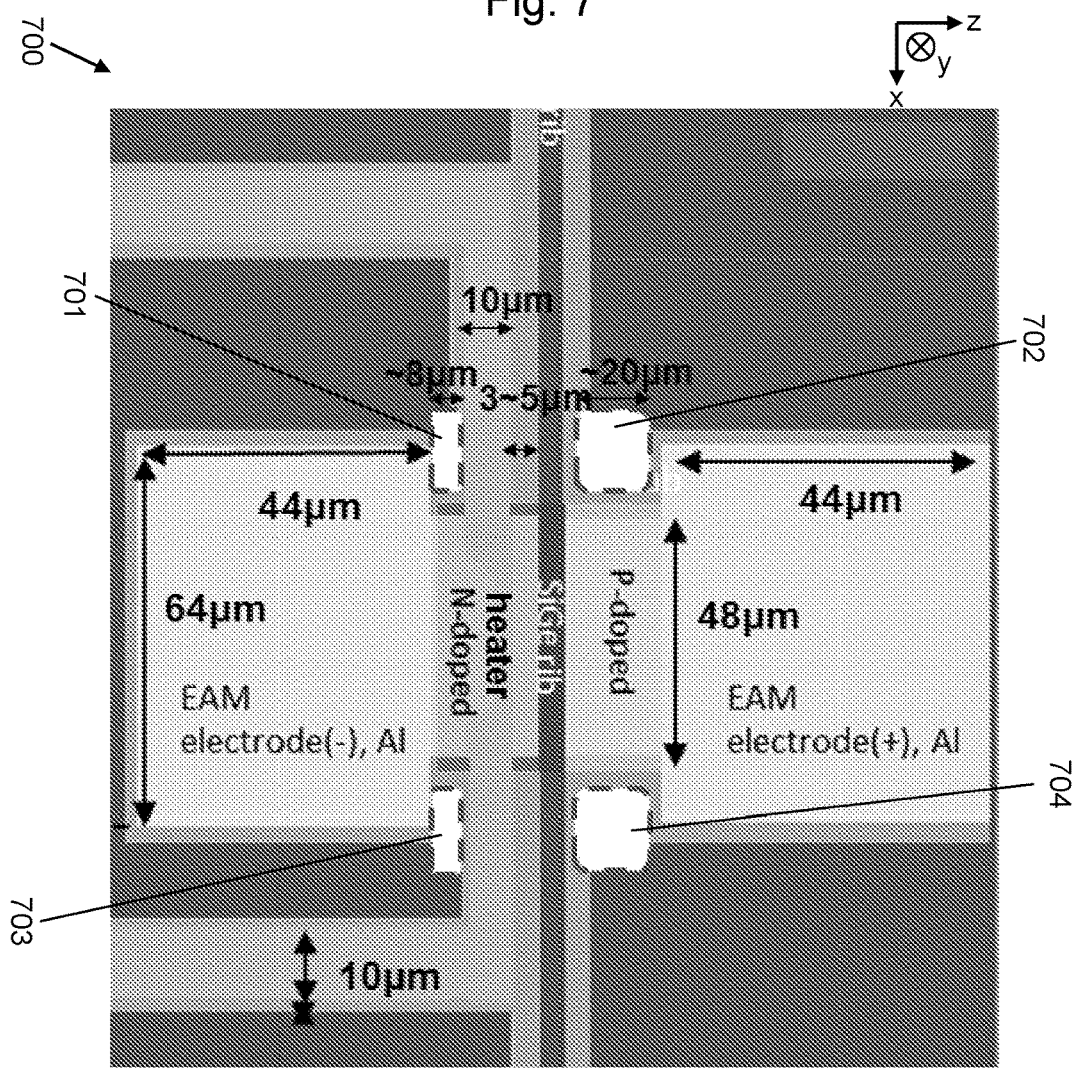
FIG. 8 is a top-down view of an optoelectronic device according to an embodiment of the present invention.

FIG. 8 shows a top-down view of a variant optoelectronic device 700 according to an embodiment of the present invention. The device 700 shown in FIG. 8 is an electro-absorption modulator, and comprises a SiGe rib waveguide adjacent to a slab portion containing a p-doped region on a first side and an n-doped region on a second opposing side of the rib waveguide. This provides a p-i-n junction, or p-n junction, where the SiGe rib includes doped sidewalls. The heater is provided above, but preferably electrically isolated from, the n-doped region. In this example, the heater can be used to tune the electro-absorption modulator so as to increase efficiency.

The device 700 includes four thermally isolating trenches: 701, 702, 703, and 704. These trenches are respectively located in corners of the slab of the waveguide. The trenches are connected by one or more thermally isolating cavities which extend beneath the slab and ridge portions of the waveguide. The thermally isolating cavities are similar in structure to that shown in FIG. 2. Depending on the degree of etching, there may be two thermally isolating cavities, each connecting pairs of thermally isolating trenches on opposing sides of the waveguide. If the degree of etching is sufficient, there may be a single thermally isolating cavity which connects all four thermally isolating trenches.

A method of manufacturing the devices discussed above includes a first step of providing a rib waveguide on a substrate of an SOI wafer. The rib waveguide comprising a ridge portion and a slab portion. A heater is also provided, which is disposed within the slab portion. These steps can either be performed in-situ, or a wafer already including the rib waveguide and heater can be provided.

Subsequently, one or more thermally isolating trenches are etched into the substrate. This etch can be performed via photolithography. The trenches are formed adjacent to the rib waveguide, and can demark a region of the slab portion. Next, the etched device is exposed to an etching fluid, which isotropically etches a thermally isolating cavity within the substrate of the device. This cavity extends from, and is directly connected to, each of the thermally isolating trenches. In the examples shown above, the etch is performed until the thermally isolating trenches are fluidly connected via the thermally isolating cavity. The etchant in this example is an etching gas including $XeF_2$. However the etchant could be an etching liquid, or etching vapour. The etchant may be in a plasma phase.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An optoelectronic device, comprising:
   a rib waveguide provided on a substrate of the device, the rib waveguide comprising a ridge portion and a slab portion;
   a heater that is formed by a doped portion of the slab portion and has an extending portion in contact with an electrode;
   a first thermally isolating trench, adjacent to the rib waveguide, and extending into the substrate of the device; and
   a thermally isolating cavity within the substrate, which is directly connected to the first thermally isolating trench, and which extends across at least a part of a width of the rib waveguide between the rib waveguide and the substrate,
   wherein a distance in a direction perpendicular to a guiding direction of the rib waveguide between the ridge portion and the extending portion of the heater is greater than a distance in the same direction between the ridge portion and the first thermally isolating trench.

2. The optoelectronic device of claim 1, wherein the first thermally isolating trench is positioned on an opposing side of the heater relative to the ridge portion.

3. The optoelectronic device of claim 1, further comprising a second thermally isolating trench, disposed on an opposing side of the rib waveguide relative to the first thermally isolating trench.

4. The optoelectronic device of claim 3, wherein the second thermally isolating trench is connected to the thermally isolating cavity, such that an overhang portion of the rib waveguide between the first thermally isolating trench and the second thermally isolating trench does not directly abut the substrate.

5. The optoelectronic device of claim 3, further comprising a third thermally isolating trench, spaced from the first thermally isolating trench in a direction parallel to the guiding direction of the rib waveguide, said third thermally isolating trench extending into the substrate.

6. The optoelectronic device of claim 5, wherein the thermally isolating cavity extends from the first thermally isolating trench to the third thermally isolating trench, between the slab portion of the rib waveguide and the substrate.

7. The optoelectronic device of claim 5, further comprising a fourth thermally isolating trench, spaced from the first thermally isolating trench in the direction parallel to the guiding direction of the rib waveguide, said fourth thermally isolating trench extending into the substrate and positioned on an opposing side of the rib waveguide to the third thermally isolating trench.

8. The optoelectronic device of claim 7, wherein the thermally isolating cavity extends from the second thermally isolating trench to the fourth thermally isolating trench, between the slab portion of the rib waveguide and the substrate.

9. The optoelectronic device of claim 1, wherein the first thermally isolating trench is fluidly connected to the thermally isolating cavity.

10. The optoelectronic device of claim 1, wherein the first thermally isolating trench and the thermally isolating cavity is filled with a contiguous insulator.

11. The optoelectronic device of claim 1, wherein the thermally isolating cavity has a semi-circular cross-section as viewed along the guiding direction of the rib waveguide.

12. The optoelectronic device of claim 11, wherein the thermally isolating cavity is formed of two partially overlapping regions each having a semi-circular cross-section as viewed along the guiding direction of the rib waveguide.

13. The optoelectronic device of claim 1, comprising:
   a plurality of pairs of thermally isolating trenches comprising the first thermally isolating trench, each of the trenches being adjacent to the rib waveguide and extending into the substrate of the device, and the trenches of each pair of trenches being arranged on opposite sides of the rib waveguide; and
   a plurality of thermally isolating cavities comprising the thermally isolating cavity and being within the substrate, each of the cavities directly connecting a respective pair of trenches of the plurality of pairs of trenches and extending across at least a part of a width of the rib waveguide between the rib waveguide and the substrate.

14. The optoelectronic device of claim 1, wherein, in a cross-sectional view taken along a cutting plane perpendicular to the guiding direction of the rib waveguide, there is no contact between:
   the rib waveguide and heater, and
   any structure surrounding the rib waveguide and heater.

15. A method of forming an optoelectronic device, including the steps of
   providing a rib waveguide on a substrate of the device, the rib waveguide comprising a ridge portion and a slab portion;
   providing a heater that is formed by a doped portion of the slab portion and has an extending portion in contact with an electrode;
   etching a first thermally isolating trench into the substrate, the first thermally isolating trench being adjacent to the rib waveguide; and
   exposing the device to an etching fluid, thereby etching a thermally isolating cavity within the substrate which at least extends from, and is directly connected to, the first thermally isolating trench across a width of the rib waveguide between the rib waveguide and the substrate,
   wherein a distance in a direction perpendicular to a guiding direction of the rib waveguide between the ridge portion and the extending portion of the heater is greater than a distance in the same direction between the ridge portion and the first thermally isolating trench.

16. The method of claim 15, wherein the etching fluid is any one of: an etching gas, an etching liquid, or an etching vapour.

17. The method of claim 15, wherein the etching fluid is an etching gas.

18. The method of claim 17, wherein the etching gas is $XeF_2$.

19. The method of claim 15, wherein the first thermally isolating trench is positioned on an opposing side of the heater relative to the ridge portion.

20. The method of claim 19, further comprising a step of etching a third thermally isolating trench, at a position spaced from the first thermally isolating trench along a direction parallel with the guiding direction of the rib waveguide.

21. The method of claim 19, further comprising a step of etching a fourth thermally isolating trench, at a position spaced from the first thermally isolating trench along a direction parallel with the guiding direction of the rib waveguide and on an opposing side of rib waveguide to the first thermally isolating trench.

22. The method of claim 15, further comprising the step of:
  etching a second thermally isolating trench, into the substrate of the device, the second thermally isolating trench being located on an opposite side of the ridge portion relative to the first thermally isolating trench.

23. The method of claim 22, wherein the thermally isolating cavity within the substrate extends from the first thermally isolating trench to the second thermally isolating trench.

\* \* \* \* \*